(12) United States Patent
Brunner et al.

(10) Patent No.: US 12,217,624 B2
(45) Date of Patent: Feb. 4, 2025

(54) LUNG SIMULATOR FOR TEACHING AND TRAINING

(71) Applicant: NEOSIM AG, Zizers (CH)

(72) Inventors: Josef X. Brunner, Chur (CH); Patrick Büchele, Azmoos (CH)

(73) Assignee: NEOSIM AG (CH)

( * ) Notice: Subject to any disclaimer, the term of this patent is extended or adjusted under 35 U.S.C. 154(b) by 1084 days.

(21) Appl. No.: 17/049,016

(22) PCT Filed: Apr. 11, 2019

(86) PCT No.: PCT/CH2019/050007
§ 371 (c)(1),
(2) Date: Oct. 19, 2020

(87) PCT Pub. No.: WO2019/200493
PCT Pub. Date: Oct. 24, 2019

(65) Prior Publication Data
US 2021/0241657 A1    Aug. 5, 2021

(30) Foreign Application Priority Data
Apr. 17, 2018 (CH) .......................... 483/18

(51) Int. Cl.
*G09B 23/30* (2006.01)
*G09B 23/28* (2006.01)

(52) U.S. Cl.
CPC .................. *G09B 23/288* (2013.01)

(58) Field of Classification Search
CPC ...... G09B 23/28; G09B 23/30; G09B 23/303; G09B 23/32
See application file for complete search history.

(56) References Cited

U.S. PATENT DOCUMENTS

| | | | |
|---|---|---|---|
| RE29,317 E * | 7/1977 | Mosley ................. | G09B 23/28 73/729.1 |
| 4,167,070 A * | 9/1979 | Orden ................... | G09B 23/32 434/272 |

(Continued)

FOREIGN PATENT DOCUMENTS

| WO | 97/12351 | 4/1997 |
|---|---|---|
| WO | 03/041778 A1 | 5/2003 |

OTHER PUBLICATIONS

PCT International Search Report for PCT/CH2019/050007 mailed May 17, 2019, 3 pages.

(Continued)

*Primary Examiner* — Kurt Fernstrom
(74) *Attorney, Agent, or Firm* — MORRISS O'BRYANT COMPAGNI CANNON, PLLC

(57) ABSTRACT

A physical lung model (PLM) for training and teaching comprising a lung compartment which is delimited by an enlargeable and reducible piston for enlarging and reducing the volume of the lung compartment, a lid sealing a first end of the piston, a support body carrying the piston in that a second end of the piston is sealingly attached to the support body; and an airway leading from the lung compartment to an airway opening.

A mechanical stop is attached to the piston and partitions the piston into a first enlargeable and reducible section and a second enlargeable and reducible section, the mechanical stop describing a path of movement during the enlargement of the lung compartment. A lever, is installed for blocking the movement of the stop at a predefined point on the path of movement during enlargement of the lung compartment and restricting the enlargement of the lung compartment.

22 Claims, 6 Drawing Sheets

(56) References Cited

U.S. PATENT DOCUMENTS

| | | | |
|---|---|---|---|
| 4,430,893 A | 2/1984 | Barkalow | |
| 5,584,701 A * | 12/1996 | Lampotang | G09B 23/285 |
| | | | 434/262 |
| 5,949,134 A | 9/1999 | Yanagisawa | |
| 5,975,748 A * | 11/1999 | East, IV | G09B 23/28 |
| | | | 703/6 |
| 6,910,896 B1 * | 6/2005 | Owens | G09B 23/288 |
| | | | 600/300 |
| 6,921,267 B2 | 7/2005 | van Oostrom et al. | |
| 7,959,443 B1 * | 6/2011 | Frembgen | G09B 23/28 |
| | | | 434/262 |
| 8,128,411 B2 | 3/2012 | Friberg | |
| 8,764,451 B2 * | 7/2014 | Mestad | G09B 23/288 |
| | | | 434/262 |
| 10,559,228 B2 * | 2/2020 | Rodriguez | G09B 23/303 |
| 2004/0110117 A1 | 6/2004 | van Oostrom et al. | |
| 2007/0122784 A1 | 5/2007 | Carvajal | |
| 2007/0264621 A1 | 11/2007 | Nysaether et al. | |
| 2009/0215017 A1 | 8/2009 | Friberg | |
| 2014/0099621 A1 | 4/2014 | Fuchs et al. | |
| 2014/0315175 A1 * | 10/2014 | Nguyen | G09B 23/30 |
| | | | 434/272 |
| 2019/0172371 A1 * | 6/2019 | Eckert | G09B 23/306 |

OTHER PUBLICATIONS

PCT Written Opinion for PCT/CH2019/050007 mailed May 17, 2019, 6 pages.

Verbraak et.al. (Verbraak, AFM, Beneken, JEW, Bogaard JM, Versprille A: Computer-controlled mechanical lung model for application in pulmonary function studies. Med &BiuolEngComput 1995, 33, 776-783).

Makary, Martin A.; Daniel, Michael, "Medical error—the third leading cause of death in the US" (British Medical Journal BMJ 2016;353:12139); May 3, 2016.

Verbraak et al. (Verbraak AFM, Holland W, Mulder B, Bogaard JM, Versprille A): Computer-controlled flow resistance. Med. Biol. Eng. Comput., 1999, 37, 770-775.

\* cited by examiner

LUNG SIMULATOR FOR TEACHING AND TRAINING

CROSS-REFERENCE TO RELATED APPLICATIONS

This application is a national phase entry under 35 U.S.C. § 371 of PCT/CH2019/050007 filed Apr. 11, 2019, which claims priority to Swiss Patent Application No. 00483/18 filed Apr. 17, 2018, the entirety of each of which is incorporated by this reference.

TECHNICAL FIELD

The present invention relates to a lung simulator for teaching and training to enhance patient safety and quality of care. Such lung simulator comprises a physical lung model. In particular, the present invention relates to a physical lung model (PLM) for training and teaching.

BACKGROUND OF THE INVENTION

"Medical error—the third leading cause of death in the US" (British Medical Journal BMJ 2016; 353:i2139). The dismal situation persists more than a decade after the first alarming report by the US Institute of Medicine. Hospitals today are characterized by increased cost pressure, sicker patients and overall reduced staffing. Additionally, personnel turnover, particularly in intensive care medicine, contributes to the increase in challenges clinicians are faced with today. Advanced technology such as sophisticated mechanical ventilators are available, yet their potential often remains untapped because of the intimidating complexity. Additionally, there is little time to learn the details of mechanical ventilators and if time is available, training is conveniently done on stable patients. Exploration of the potentially lifesaving and beneficial fine-tuning capabilities of modern mechanical ventilators on patients by novice users is close to impossible. Consequently, these benefits remain unused in clinical practice. Furthermore, the proper ventilator settings in rare and life threatening situations cannot be practiced in stable patients—and thus remain a threat to be tackled with when they occur, with outcomes that cannot be predicted. It is therefore of great benefit to clinicians and patients alike when the capabilities of mechanical ventilators can be explored on a lung simulator that is both life-like and affordable.

Many simple mechanical lungs are available at reasonable cost today to explore basic functionalities of mechanical ventilators. One such design is disclosed in U.S. Pat. No. 4,430,893 and comprises a set of bags compressed by springs and connected to the common airways by virtue of a pneumatic resistor. While such simple mechanical lungs are affordable and widely available, they lack many of the features necessary to train and teach life-like situations.

It is known that simulation training is best if the immersion is complete, in other words, if the simulator behaves like a real patient. For this reason, it is advantageous to have a simulator that is as close to physiological reality as possible. For this reason, a life-like simulator advantageously has at least the following capabilities: access through anatomically correct airways, use of actual air and oxygen mixture, form and size of a real patient, be able to be ventilated or spontaneously breathing or a combination thereof, show signs of hypoxemia and dyspnea, and respond with plausible pressures, volumes and gas compositions. For example, if the patient is provided with some form of respiratory support, the level of support shall be reflected on the patient's oxygenation. Simple mechanical lungs, for example such as the one disclosed in U.S. Pat. No. 4,430,893, fall far short of the requirements stated.

For this reason, so called high-fidelity simulators were developed recently and as disclosed in, for example, U.S. Pat. No. 5,975,748 or 6,921,267. Some of these simulators allow partial simulation (METI, Laerdal, ASL5000, U.S. Pat. No. 5,975,748) and work only in combination with an operator who changes some of the physiological variables in response to treatment. Some simulators are able to deliver actual treatment response, e.g. US 2014/0099621. Whatever the capabilities, these high-fidelity lung simulators unanimously use expensive technology and widespread use is limited for economic reasons. Thus, their impact on teaching and training and, particularly, improvement of quality of care is far below optimal.

While high-fidelity adult-lung simulators are readily available, albeit at high cost, real-life lung neonatal lung-simulators are not. The reasons are simply technological challenges which make miniaturization difficult for the reasons provided further down below.

There is a clear need for an affordable and yet life-like high fidelity lung simulator, especially simulating lungs of newborns, for teaching, training and, consequently, improving quality of care.

STATE OF THE ART

Lung simulators provide the opportunity to push gas inside them with a response typical for human patients. This response may comprise gas pressure, inhaled and exhaled gas flows, $CO_2$ concentration of the exhaled volume, oxygen concentration of the exhaled volume, simulated signs and symptoms of blood oxygen content, breathing rate, or even heart rate.

Pressure in the lungs is created by pushing air inside the lungs. The relationship between volume and pressure is known as Compliance Crs, CL or Cw, usually given in units of ml/mbar. In a healthy adult, the normal total respiratory compliance (that is the total of lungs and chestwall) is around 60 ml/mbar. In a newborn, the total respiratory compliance is around 3 ml/mbar. In a neonate, the respiratory compliance may be as low as 1 ml/mbar. As known in the art, one, two or several artificial lung compartments can be connected in parallel to simulate one or more compartments of the lungs. These different lung compartments can be driven by different motors, thereby creating different characteristics. Usually, these lung volumes are connected to a mouth (also called airway opening) by virtue of a tube, simulating the trachea, also known as "airways". The result of such simulated gas exchange is immediately visible at the airway opening as change in volume, flow, pressure and/or gas composition.

Compliance in sick patients is not linear, it changes with lung volume, the degree of illness (see FIG. 2) and therapy. Some lung simulators create non-linearity by means of motors, which are included in the design to simulate such non-linearity.

Inhaled and exhaled air flow is governed by the respiratory system compliance Crs, the respiratory activity of the patient known as "muscular pressure" Pmusc, and the resistance to air flow Raw. Respiratory activity can be created by electrical motors or pneumatic means and is expressed in depth of breathing which creates periodic increases in lung volume known as tidal volume (Vt) as well as in rate of breathing RR expressed as cycles per minute.

It is known in the art that adding additional tubing to the lung volume creates both dead space Vd and airways resistance Raw. Restricting the diameter of the airways increases Raw. In the healthy adult, typical airways resistance is around 5 mbar/(L/s) (i.e. millibar per (litre per second)). In newborns, this resistance can be as high as 40 mbar/(L/s) or in a neonate even exceed 100 mbar/(L/s). Restricting the airways to simulate airways resistance is known in the art.

Adding known amounts of CO2 to the lung or the lungs creates CO2 at the airway opening as soon as the simulator exhales. This is expected and a known method to simulate metabolic activity of the lung simulator.

Parts of the lungs may collapse in disease and stop contributing to gas exchange. As a result, the arterial blood does not carry enough oxygen anymore which can be measured with, for example, a pulse oximeter or with established blood gas analysis. Normally, the saturation of oxygen in the blood is close to 100% and the partial pressures reported by blood gas analysis are close to the oxygen partial pressure of the inhaled gas mixture minus the exhaled partial pressure of carbon dioxide. Apparent lung collapse can be simulated by motors that drive a bellows or a piston, measured, and the effect on arterial oxygen content can be calculated and reported to the trainee. If the trainee takes appropriate action to increase the lung volume, for example by increasing the end-expiratory pressure level (PEEP), and the lung simulator is programmed to respond, then lung volume can be restored, the results on oxygen in the blood can be calculated and reported to the trainee. This way, the lung simulator responds to treatment and provides the desired real-life effect.

Low fidelity simulators are usually bags made of rubber or silicone which can accept a certain volume and can take certain pressures defined by the material characteristics of these bags. U.S. Pat. No. 8,128,411 and US2007/0122784 disclose such simple systems. Compliance and/or resistance can be altered manually by moving levers and rotary knobs to desired positions enabling the simulation of different patients. However, these low fidelity simulators do not have measurement capabilities, cannot simulate non-linear lung compliance, do not simulate spontaneous breathing, do not provide any measurement data and lack the physiological response to treatment.

High-fidelity simulators invariably simulate lung volume and breathing with bellows and/or pistons which are actuated using electrical or pneumatic motors. A typical design is disclosed in Verbraak et. al. (Verbraak, A F M, Beneken, J E W, Bogaard J M, Versprille A: Computer-controlled mechanical lung model for application in pulmonary function studies. Med&BiuolEngComput 1995, 33, 776-783) with a number of bellows which serve as lung spaces and/or drivers of those lung spaces and which are connected with each other to represent pulmonary mechanics. Another solution, disclosed in WO9712351 or U.S. Pat. No. 5,975,748, uses a piston to represent the lung volume, driven by a motor to create the necessary pressures. In the current state of the art, for example in US 2014/0099621 or U.S. Pat. No. 5,975,748, some physical characteristics of these bellows or pistons, for example their elasticity or friction, respectively, are undesired and need to be measured and compensated for. The necessary sensors and actuators significantly add to the overall cost of the device. While these simulators provide realistic lung simulation, the cost of these simulators is prohibitive for wide spread application.

High fidelity lung simulators invariably are large because the many functions of the lungs need to be implemented by technology. One example is disclosed in U.S. Pat. No. 6,921,267 where the technical part comprises a full sized bed under the adult sized mannequin. Even compact inventions such as US 2014/0099621 still take too much space to fit into an adult body.

High fidelity lung simulators are feedback controlled devices. Because the natural frequency of the components used is close to the spectral components of the breathing pattern, either spontaneous or created by the external therapy devices, feedback control is inherently unstable. As a result, unnatural oscillations may occur which render real-life simulations unrealistic.

In summary, the state of the art lung simulators suffer from the following deficiencies:
Low fidelity lung simulators lack significant features (see details described above).
High fidelity lung simulators deal with the following issues:
The characteristics of the bellows are undesired and should be compensated.
Frictional forces present a special challenge for feedback control when using piston-type arrangements.
Special means are required to reduce friction of the bearings, for example the use of two bellows to balance forces or the use of a rolling seal.
The cost for linear motors, rolling seals and other means to make the designs of high-fidelity simulators feasible, are high.
State-of-the-art high-fidelity simulators use feedback control to achieve the desired features-feedback control is inherently unstable for the reasons given above and produce signal noise which is disturbing to the trainees.
Simulation training is still not available in many hospitals because affordable simulators are low-fidelity and are not suited for advanced training and high-fidelity simulators are too expensive.
Because high-fidelity lung simulators are available only to a few, effective training of modern ventilators and thus the impact on quality of care are limited.
The size of high-fidelity lung simulators is such that they hardly fit into adult-sized mannequins-reduction to neonatal size is nearly impossible.

ADVANTAGES OF THE INVENTION

The present invention addresses these deficiencies while preserving the features necessary to create a real-life, high-fidelity and fully immersive training experience. The goal is to make high-fidelity simulation training available in all hospitals at reasonable cost. A further goal of the present invention is to reduce the size of a high-fidelity lung simulator to fit into human sized mannequins, particularly neonates. Yet a further goal is to use no feedback control schemes in order to avoid unnatural signal noise.

SUMMARY OF THE INVENTION

The present invention satisfies the foregoing needs by providing a physical lung model, a lung simulator comprising said physical lung model and a method of simulating lung mechanics.

Disclosed is a physical lung model (PLM) for training and teaching comprising
a lung compartment which is delimited by
an enlargeable and reducible piston (i.e. e.g. an enlargeable and reducible bellows) for enlarging and reducing the volume of the lung compartment, a lid sealing a first end (of the extension) of the piston, a support body carrying the piston in that a second end (of the extension) of the piston is sealingly attached to the support body;

and further comprising an airway leading from the lung compartment to an airway opening, wherein a mechanical stop is attached to the piston and partitions the piston into a first enlargeable and reducible section and a second enlargeable and reducible section, the mechanical stop describing a path of movement during the enlargement of the lung compartment, and a lever is installed for blocking the movement of the stop at a predefined point on the path of movement during enlargement of the lung compartment and, thereby consequently, restricting the enlargement of the lung compartment.

In particular, the physical lung model may comprise one or several lung compartments, one or several mechanical stops and one or several levers, thus, at least one lung compartment, at least one mechanical stop and at least one lever.

The mechanical stop is fixed at the piston within the enlargeable and reducible piston part and, therefore, is laterally moved with respect to the ends of the piston, when the piston is compressed or enlarged. In particular, since the second end of the piston is fixedly attached to the support body, the mechanical stop is moved with respect to said second end of the piston and thus with respect to the support body.

By means of the lever, which can be set to block the movement of the mechanical stop to some degree, an experimenter is able to restrict the enlarging or reducing movement of the piston partially, so as to simulate a condition of an ill or damaged lung. By means of said lever an experimenter is able to set or simulate a specific compliance response of the physical lung model.

The present physical lung model (PLM) enables a user to simulate the effect of a changed (usually reduced) lung expansibility, in particular the effect of a reduced lung compliance.

Advantageously, the piston comprises a restoring force, for restoring the length of the piston. Advantageously, the piston is elastic in axial direction, and therefore—if no externally applied forces prevent it—the piston is able to restore its idle shape and thus its idle resting length. In particular, the piston is elastic in the same direction in which it is enlargeable and reducible.

In particular, the lever is adjustable for the purpose of setting said predefined point at any desired position on said path of movement of the stop. This way, different degrees of illness or damage may be simulated by setting different lever positions on said path of movement.

Advantageously, the lever can be adjusted or set by adjusting a distance between the lever and the mechanical stop. Advantageously, the lever can be adjusted or set by adjusting a distance between the lever and the mechanical stop during operation of the physical lung model. During enlarging and reducing the piston, when lever and mechanical stop do not touch each other, the lever does not influence compression or enlargement of the piston. However, when the lever blocks the movement of the mechanical stop, reduction or enlargement properties of the piston are altered.

Advantageously, the mechanical stop and the lever are arranged outside of the lung compartment. This way the construction of the physical lung model can be kept relatively simple, because there are no additional sealing issues.

Physical lung model according to any one of claims 1 to 4, characterized in that, for the purpose of adjusting the lever, the lever is driven by a motor, such as a linear servo-motor. This allows automatic setting of the lever by e.g. a computer.

Advantageously, the piston is a corrugated piston. Advantageously, the corrugated piston has a corrugated lateral area, such that the piston can be compressed and extended in axial direction (i.e. axial extension). At the same time, advantageously, in directions perpendicular to said axial direction, the corrugated piston maintains its size essentially, in particular its cumulative or average size.

Advantageously, the piston is tube-shaped (or cylinder-shaped), enlargeable and reducible in its axial extension (i.e. longitudinal extension). In particular, the piston is tube-shaped having a corrugated lateral area, such that the piston can be compressed and extended in axial direction (i.e. axial extension).

Advantageously, the piston is corrugated in that it comprises folds or ripples which extend perpendicular with regard to said axial direction.

The corrugated piston comprises e.g. ripples or folds (i.e. a corrugated area), by means of which the piston is reducible and enlargeable in its axial direction. Optionally, the mechanical stop is attached to a ripple or fold of the corrugated piston or in-between two ripples or folds.

The mechanical stop, which is fixed at the piston within the enlargeable and reducible piston part, for example in particular is fixed within the corrugated area, i.e. at the corrugated piston wall, and therefore is laterally moved with respect to the ends of the piston, when the piston is compressed or enlarged.

Moreover Advantageously, the corrugated piston comprises restoring or elastic properties, such that the corrugated piston acts elastic in its axial direction. In particular, the corrugated piston is elastic in that it has the ability to react to a distorting influence (such as compressing force or pulling force) by enlarging or reducing its length and to return to its original size, shape and length when that influence or force is removed.

Advantageously, the lid is a rigid lid. This means that the lid is inflexible, so that during compression and enlargement of the piston the lid does not flex, but remains in its original shape.

Advantageously, in the physical lung model, means are present that allow to determine the volume of the lung compartment and/or volume changes of the lung compartment over time.

Advantageously, in the physical lung model, means, in particular measuring and computing means, are present that allow to determine the position of the lid and/or changes of the position of the lid and based thereon allow to determine the volume of the lung compartment and/or volume changes of the lung compartment over time.

Advantageously, a string with one end is fixed to the lid and with the other end is wound-up on a reel and a rotary encoder is coupled to the reel.

Advantageously, the rotary encoder serves for measuring the rotation of the reel and, thus, for determining the position or change of position of the lid. The position or change of position of the lid can be determined if the string is pulled taut at all times.

Advantageously, a motor drives the reel to wind-up the string.

Advantageously, the motor is controlled by a constant current (e.g. by a constant current of a first predetermined value) to keep the string pulled taut (i.e. such that the string is not slack or loose) and optionally in addition the motor is controllable (e.g. by applying currents having values higher than said first predetermined value) to pull the lid at a predetermined force to simulate a patient's own inhaling effort.

When the motor is controlled by a constant current of a first predetermined value to keep the string pulled taut without at the same time pulling the lid to simulate a patient's own inhaling effort, then said first predetermined value of constant current is below a threshold, such that the pulling force of the motor is weaker than a threshold or an elastic force of the piston and, thus, is too weak to cause compression or enlargement of the piston. If the piston is elastic in axial direction it provides a restoring force which acts to enlarge the piston when the piston with regard to its idle or relaxed status is compressed or acts to reduce the piston when the piston is stretched with regard to its idle or relaxed status.

For example, it is advantageous that the support body is shaped as cylinder (e.g. with an inner diameter) larger than (e.g. the outer diameter of) the piston, at a first end comprises a cover plate and at a second end carries the piston, and that the support body and the piston are mutually arranged such that the piston is housed within the cylinder of the support body.

Advantageously, the physical lung model is construed such that the volume of the compartment is enlarged when reducing the piston. And consequently, the physical lung model also is construed such that the volume of the compartment is reduced when enlarging the piston.

The support body comprises on a first end a cover plate and on a second end a sealing on which with its first end the piston is attached, while the second end of the piston is closed with the lid. Thus, support body and piston form the lung compartment. In particular, the piston is housed within the cylinder of the support body such that the external side of the piston with its lid is facing the inside of the lung compartment and such that the internal side of the support body with its cover plate is facing the inside of the lung compartment. In an example the support body is shaped as circular cylinder with an inner diameter larger than the outer diameter of the piston, which piston also may be shaped as a circular cylinder. Advantageously, the piston is housed coaxially within the cylinder of the support body.

Advantageously, the airway exits the lung compartment via the support body. Most advantageously, the airway exits the lung compartment via the cover plate of the cylinder-shaped support body.

Advantageously, the support body is rigid. Advantageously, also the cover plate is rigid. Rigid here means that support body and cover plate are inflexible, so that during compression and enlargement of the piston support body and cover plate do not flex, but remain in their original shape.

Advantageously, the lung compartment comprises an inlet of a gas supply, e.g. for CO2. Advantageously, said inlet is arranged near or at the second end of the cylinder-shaped support body.

Advantageously, the inlet of the gas supply is equipped with a pressure sensor.

Advantageously, the airway is equipped with at least one valve. With said valve the size of the air passage through the flow restrictor into the lung compartment may be regulated.

It is advantageous that the airway comprises a manifold of at least two flow restrictors and optionally the flow restrictors are equipped with valves. With said valves the size of the air passage through the flow restrictors into the lung compartment may be regulated.

Advantageously, the airway comprises a pressure sensor, advantageously near or at the airway opening.

Advantageously, the lung compartment comprises an alveolar pressure sensor. Advantageously, the alveolar pressure sensor of the lung compartment is fitted near or at the cover plate of the cylinder-shaped support body.

Advantageously, the lung compartment comprises an alveolar oxygen sensor. Advantageously, the alveolar oxygen sensor of the lung compartment is fitted near or at the cover plate of the cylinder-shaped support body.

The piston may be made of silicone, in particular of a material with elastic properties that are close or equal to the elastic properties of the human lung, for example with values in the range from 1 ml/mbar to 60 ml/mbar, in particular in the range from 1 ml/mbar to 3 ml/mbar for neonates or from 30 ml/mbar to 60 ml/mbar for adults.

Advantageously the piston is elastic due to its material properties. Alternatively or in addition, the property of elasticity of the piston is established due to its constructional implementation. A constructional implementation e.g. may include spring means attached to the two ends of the piston and thereby separating the two ends of the piston from each other in an unbiased condition, but providing a restoring force when the piston is enlarged or reduces with regard to its size or extension in the unbiased condition.

Further disclosed is a physical lung model (PLM) for training and teaching comprising a lung compartment, which is delimited by an enlargeable and reducible piston for enlarging and reducing the volume of the lung compartment, a lid sealing a first end of the piston, and a support body carrying the piston in that a second end of the piston is sealingly attached to the support body; and further comprising an airway leading from the lung compartment to an airway opening; whereby the support body is shaped as a cylinder, which is larger than the piston, at a first end comprises a cover plate and at a second end carries the piston; and whereby the support body and the piston are mutually arranged such that the piston is housed within the cylinder of the support body. Such arrangement of cylinder and piston has the advantage that during operation of the physical lung model the volume of the compartment is enlarged when the piston is reduced and the volume of the compartment is reduced when the piston is enlarged. Advantageously, during operation the piston of this physical lung model remains within the cylinder at all times.

Further disclosed is a lung simulator for treating and training comprising
- a physical lung model (as described above),
- a control unit reading sensor and status data from the physical lung model and setting actuators, such as valves and motors, in the physical lung model,
- a physiological model unit comparing sensor and status data from the physical lung model with data desired and input by an operator and providing amended settings for the physical lung model on the basis of physiological and/or pathophysiological models,
- a graphical user interface receiving operator input and presenting sensor and status data of the physical lung model provided via the physiological model unit.

Optionally, said simulator further comprises a diagnostic module providing simulated patient reactions on the basis of sensor and status data from the physical lung model and/or allowing for carrying out diagnostic procedures.

Further disclosed is a method of simulating lung mechanics, specifically the non-linear relationship between applied pressure and resulting volume, in particular for training and teaching purposes, comprising providing an enlargeable and reducible piston, e.g. corrugate piston, having two ends, wherein
a lid is attached sealingly to the first end (of the extension) of the piston, and
the piston with its second end (of its extension) is sealingly attached to a support body,
said support body, piston and lid forming an enlargeable and reducible compartment, so that the first end of the piston may move freely during enlargement and reduction of the piston,
enlarging and reducing said compartment by enlarging and reducing the piston (i.e. an enlargeable and reducible bellows) for simulating enlargement and reduction of a lung volume, and
restricting the enlargement of the compartment by blocking the movement of a section of the piston (i.e. by blocking the movement of only a section of the piston) during enlargement of the compartment for simulating reduced lung compliance, or if the piston is a corrugated piston restricting the enlargement of the compartment by blocking the movement of at least one but not all of the folds or ripples of the corrugated piston at a predefined point on the path of movement of said at least one but not all folds or ripples during enlargement of the compartment for simulating reduced lung compliance.

In particular, by blocking the movement of a section of the piston is meant to block the movement of only a section of the piston, while another section of the piston still may enlarge or reduce unhindered by said blocking.

Advantageously, the compartment is enlarging in volume, when the piston is diminishing in volume.

In an alternative example, the compartment is enlarging in volume, when the piston is enlarging in volume.

For the purpose of the method of simulating lung mechanics, it is advantageous that the piston is provided with a mechanical stop, which mechanical stop is attached to the piston and thereby divides the piston into a first enlargeable and reducible section and a second enlargeable and reducible section, wherein the movement of a section of the piston can be blocked by restricting the movement of said mechanical stop. The movement of said mechanical stop is restricted e.g. by a lever which is attached to the support body or a common support of the support body and the lever.

In particular, when the piston is a corrugated piston, for the purpose of the method of simulating lung mechanics, it is advantageous that the corrugated piston is provided with a mechanical stop, which mechanical stop divides the corrugated piston into a first enlargeable and reducible corrugated section and a second enlargeable and reducible corrugated section, wherein the movement of at least one but not all of the folds or ripples of the corrugated piston can be blocked by restricting the movement of said mechanical stop.

Advantageously, for determining volume and/or volume change of the compartment over time, the position of the lid is determined by a rotary encoder which is coupled to a motor-driven reel to wind-up a string, which with one end is fixedly attached to the lid, for measuring the change of length of the wound-up string, in that the motor is controlled by a constant current (of a first predetermined value) to keep the string pulled taut (i.e. such that the string is not slack or loose).

Advantageously, in addition the motor is controlled (e.g. by applying currents having values higher than said first predetermined value) to pull the lid with variable force to simulate a patient's own inhaling effort.

Advantageously, the physical lung model is used in that an artificial ventilator is attached to the airway opening for applying and, thus, simulating artificial ventilation.

Advantageously, a patient's exhaling is simulated by reducing all applied forces so that the extension of piston can restore towards its idle shape due to its elastic properties.

BRIEF DESCRIPTION OF THE DRAWINGS

The invention will be described in detail hereinafter with reference to the figures, in which, schematically

DETAILED DESCRIPTION OF THE DRAWINGS

The work leading to the herein presented results was focussed on reducing cost and size of the lung simulator. The numerical examples provided herein relate to a neonatal lung simulator. However, the present invention can readily be applied to the design of adult lung simulators.

As known from the state of the art, a lung simulator comprises an air chamber with a volume of air or gas mixture in an expandable gas compartment and comprises adaptable operating means for simulating different patient conditions. Furthermore, the lung simulator comprises sensor means for measuring values of physical parameters related to the air or gas mixture, a control unit configured to read the output of the sensor means in order to estimate/calculate/derive the success of the therapy provided by the caregiver, depending on the output of the sensor means and based on entered physiological and pathophysiological parameters defining a patient's health status.

Figure 1:
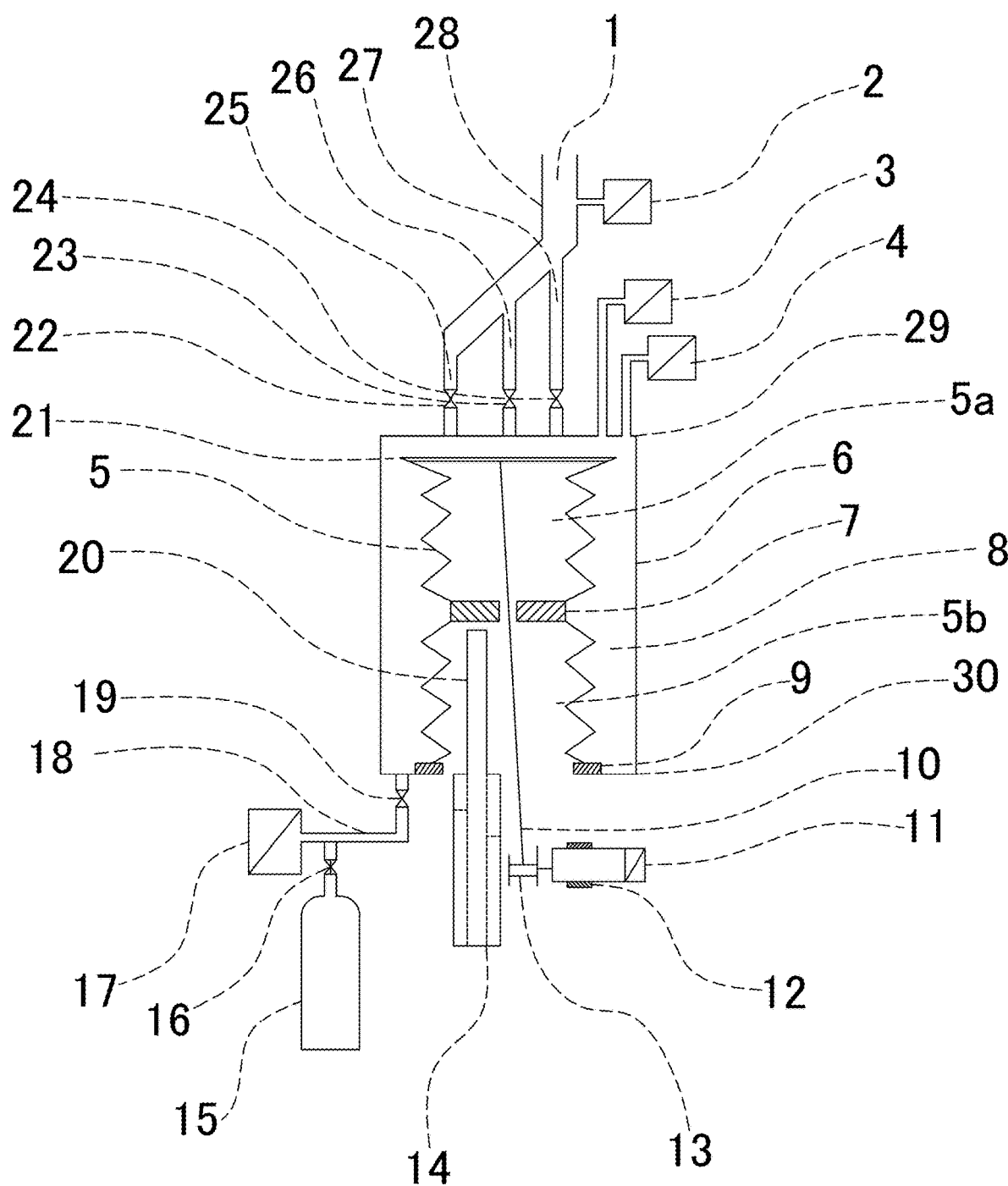
FIG. 1 shows a physical lung model (PLM) according to the present invention.

As illustrated in FIG. 1 in a first embodiment a lung compartment 8 is defined by a rigid enclosure 6, for example a cylinder, and at least one corrugated piston 5. The corrugated piston is a tube of cylindrical shape with folds or ripples foldable across the axial direction of the tube. The corrugated piston may also be described as tube-shaped bellows, corrugated tube or corrugated cylinder. The corrugated piston 5 is attached to the rigid enclosure 6 in a way to leave the inside of the corrugated piston 5 completely open to atmosphere. Enclosure 6 and corrugated piston 5, each is fitted with a closure at one of its two ends, in particular, the enclosure 6 is fitted with cover plate 29 and the corrugated piston is fitted with lid 21. Enclosure 6 and piston 5 join at attachment 9 to form the lung compartment 8. The corrugated piston 5 may be described as compressible and expansible tube, thus as corrugated tube. The corrugated piston 5 is fitted with a rigid lid 21 at one end and open on the other providing access to the inside of the tube. Advantageously the volume of the tube changes by compression or expansion. Essentially, compression and expansion occurs in axial direction of the corrugated piston. The corrugated piston 5 is made of a material, e.g. silicone, with elastic properties that are close or equal to the elastic properties of the lung, for example in the range from 1 ml/mbar to 3 ml/mbar for neonates (or from 30 ml/mbar to 60 ml/mbar for adults). Access to the lung compartment 8 is provided through an airway opening 1 leading via the airway 28 to at least one inlet. In an advantageous option, the airway splits up into a manifold with multiple arms or flow restrictors 25, 26, 27 leading to a multitude of lung compartment inlets. Each of said at least one inlet comprises a valve, e.g. a solenoid valve. Most advantageously are two or more inlets, for example three inlets with respective controllable solenoid valves 22, 23, 24. Advantageously, the valves 22, 23, 24 can be controlled independently. The inlets advantageously are located at the cover plate 29 of the enclosure 6. Pressure at the airway opening (Paw) is measured with a first pressure sensor 2 and pressure inside the lungs (Palv), i.e. inside compartment 8, is measured with a second pressure sensor 3. The oxygen content of the air inside the lung compartment 8 is measured by an oxygen sensor 4, e.g. by a fuel cell which measures oxygen partial pressure (PAO2). The second pressure sensor 3 and/or the oxygen sensor 4 for example are attached at the cover plate 29, however other locations at the enclosure wall 6 would be possible. Due to the compressibility of the corrugated piston 5, the lung compartment 8 can vary in size, for example by applying a pressure via the airway opening 1. Pressure higher than atmosphere will move the lid 21 and compress the corrugated piston making room within lung compartment 8. The movement of the lid 21 is indicative of volume and change of volume within lung compartment 8 and can be measured with any method that assesses the excursion of said lid 21. One possibility to measure the excursion of the lid 21 is to use readily available proximity sensors, for example the Vishay VCNL4030X01 series (www.vishay.com). Another possibility shall be described as follows.

A DC motor 12 coupled with a rotary encoder 11 is fitted with a pulley or reel 13 on which one end of a flexible string 10 is attached. The other end of the flexible string 10 is attached to the centre of the lid 21. The DC motor 12 is mechanically attached to the rigid enclosure 6 and supplied with a variable electrical current. The torque of the DC motor is determined by said electrical current. By varying said electrical current, different levels of torque can be obtained. Advantageously, a brushed DC motor is used because current and torque are uniquely related to each other. No further calibration is necessary as the current determines the electromagnetic field and the electromagnetic field determines the mechanical forces, including the torque of the motor. Of course, precise calibration could be done to improve accuracy. In the present invention, the current is set to achieve a minimal torque to straighten the flexible string 10 and to follow the movement of the corrugated piston lid 21. As soon as said lid 21 is moving, the DC motor 12 starts turning and winds up the flexible string 10. The rotary encoder 11 measures the rotation of the motor shaft, typically in increments of 256, 512 or higher. For the present invention and the dimensions of the pulley 13, for example 5 mm in diameter, 512 steps per rotation are sufficient. Since the rotation of the pulley 13 and, hence, of the motor shaft depends on the movement of the lid 21, the encoder 11 provides a signal that is proportional to the excursion of the lid 21 of the corrugated piston 5. Knowing the geometry of said first corrugated piston 21, the volume can readily be calculated from the encoder signal. Flow can be derived thereof by dividing the volume change by the time interval of such change.

In practice, the pulley or reel 13 or rather its supportive housing is directly or indirectly attached to or fixed with regard to the enclosure body 6 and cover plate 29 in order to be able to pull lid 21. Although not shown in FIG. 1, this is implicit to present disclosure.

An advantage of volume measurement as described above is signal stability. In contrast to alternative means of volume and flow measurement, the measurement disclosed herein does not drift.

A further advantage of volume measurement as described above is that the same DC motor 12 can be used to apply respiratory muscle activity Pmusc. This is achieved by adding current proportional to breathing activity on top of the minimal torque needed to straighten the string. Any form of breathing activity can be achieved this way.

A further advantage of volume measurement as described above is that the same DC motor 12 can be used to increase the compliance of the corrugated piston 5. Compliance defines the function between pressure and volume within the lung chamber 8. The current to the DC motor 12 can be made dependent on the measured volume thus providing means to create such function between pressure and volume.

When no pressures or forces are applied to the Physical Lung Model (PLM), described in FIG. 1, all mechanical components will move to positions which are defined by their mechanical properties. This state is defined as "initial equilibrium".

The use of a solid piston in a rigid enclosure to create expandable (i.e. enlargeable) spaces and volumes is known in the art (U.S. Pat. No. 5,975,748). The present invention uses an elastic, or an elastic and corrugated piston, which is essentially elastic in one axial direction with a specific intrinsic elasticity. An intrinsic restoring force allows the corrugated piston to re-expand in said axial direction after a compression by external force or to re-reduce in said axial direction after expansion by external force. Advantageously, at the same time the corrugated piston is essentially neither elastic nor expandable or compressible in any direction perpendicular to said axial direction. Advantageously, the elasticity of the corrugated piston is in the range of elasticities which are typical for the patient to be simulated. For neonates, typical elasticity ranges are from 0.5 ml/mbar to 5 ml/mbar.

A lid 21 is used to seal the first end of the corrugated piston 5 and a further sealing element 9 is used to seal the other, second end of the corrugated piston 5. Advantageously, the corrugated piston 5 consist of at least two joint corrugated sections 5a and 5b. The corrugated piston 5, which comprises said at least two joint sections 5a and 5b is further fitted with a mechanical stop 7, where the two sections 5a and 5b join. The mechanical stop 7 may be formed as a rigid rim sandwiched between said two sections 5a and 5b and protruding therefrom into the inside of the corrugated piston. The mechanical stop 7 permits to control or rather reduce the expansion of one of the sections of the corrugated piston 5. For example, lever 20 can be set to block the mechanical stop 7 at a desirable location of the path of movement of the mechanical stop 7 during expansion of the corrugated piston 5. For adjustment of said location the lever 20 can be moved by the servo motor 14 to hold the mechanical stop 7 in place at the location of the tip of the lever 20. As a result, only the first section 5a of the corrugated piston can move freely, while the movement of the second section 5b is partially blocked, and the elasticity of the system (i.e. the elasticity of the corrugated piston 5 as a whole and in particular the elasticity of piston section 5a) is thus reduced. For example, if corrugated piston 5 is divided into two equal parts (such as 5a and 5b) and one half is held in a fixed position, then the compliance of the simulated lung is halved. Advantageously, the corrugated piston 5 with mechanical stop 7 and the lever 20 are positioned such that for the system at rest (no pressure applied to the lung compartment) there is a defined distance between the mechanical stop 7 and the lever 20. If the corrugated piston 5 is moved by either external forces or by the motor 12, the elastic forces to overcome are defined by the entire corrugated piston 5. For a healthy term baby, this elasticity corresponds to a respiratory compliance of about 5 ml/mbar. As soon as the corrugated piston 5 is compressed enough so that the mechanical stop 7 is brought to a halt by touching lever 20, the elasticity of the respiratory system is reduced (in particular is halved if sections 5a and 5b essentially are equal). The closer the mechanical stop 7 and the lever 20 are at initial equilibrium, the lower the volume needed until the compliance of the system drops and the "sicker" the lungs are.

The location where the lever 20 blocks further movement of the mechanical stop 7 can be changed statically as well as dynamically. Meaning on one hand that the lever may be set when the physical lung model is not operational (statically setting). On the other hand meaning that the lever 20 may be set or adjusted during operation of the physical lung model (i.e. adjusted dynamically or in real-time). The dynamical adjustment is particularly advantageous for the purpose of simulating an improving or worsening lung. For example, depending on whether the movement of the mechanical stop 7 is blocked in its movement path repeatedly later or repeatedly earlier, an improving lung or a worsening lung, respectively, can be simulated.

In practice, the lever 20 or rather its supportive housing is directly or indirectly attached to or fixed with regard to the enclosure body 6 and cover plate 29 in order to be able to block movement of stop 7. Although not shown in FIG. 1, this is implicit to present disclosure.

Some characteristics of the embodiment according to FIG. 1 are the following: the movement of the corrugated piston 5 can be influenced by the lever 20; the inside of the corrugated piston 5 is always open (i.e. completely and directly open) to atmosphere; the expansion of the lung compartment 8 is brought about by compression of the corrugated piston 5; and the compression and expansion of the corrugated piston 5 is defined by the forces acting on the rigid lid 21, such as e.g. air flow pushed into the lung compartment due to artificial ventilation (compressing effect on piston), motor force pulling the lid to simulate a patient's own inhaling effort (compressing effect on piston), and an intrinsic restoring force of the corrugated piston (e.g. expanding effect of the elastic piston after an external compressional force is reduced or removed).

To enable a corrugated piston system to work it is imperative to have a tight seal between piston and its enclosure body. Such sealing of the piston is, for example, done with O-rings. However, the use of any sealing method imposes frictional forces on the movement of piston and such friction is not desired in simulating lung mechanics. The present invention overcomes these disadvantages by sealing the non-moving end of the corrugated piston 5 with seal 9. The other end of the corrugated piston 5 including the lid 21 of the corrugated piston 5 are free to move and do not present any friction because ideally there is no mechanical coupling (thus also no contact) between the lid 21 or the moving part of corrugated piston 5 and the inside wall of the cylindrical enclosure 6.

The element of the corrugated piston 5 is conveniently implemented as a corrugated silicone tube. Essentially, such a corrugated piston acts elastic in one dimension only, thus solely allows elastic behaviour in linear axial direction of compression and elongation. In another implementation, springs covered with a sealing material such as a plastic foil can be used. In yet another implementation, springs connected in series with each other and covered by a sealing material are used.

Description of the Function of the First Embodiments:

In a first embodiment of the invention, the corrugated piston 5 resides within a rigid enclosure 6, for example a cylinder. The corrugated piston is sealed on one end 9 to the lower portion of the cylinder 30 and is closed with a lid 21 on the other end. The internal volume of the corrugated piston 5 is not part of the lung compartment 8, but is outside the corrugated piston 5. Consequently, an expansion of the corrugated piston 5 decreases the volume of the lung chamber 8 (FIG. 1) and compression of the corrugated piston 5 increases the volume of the lung chamber 8. Compression of the corrugated piston 5 increases the volume of the lung chamber 8 until both sections 5a and 5b of the corrugated piston 5 are completely compressed. At this volume, lid 21 comes to a halt no matter how much more pressure is applied to the lung simulator. The transition to said halt of lung expansion is known as "upper inflection point" in lung physiology (see FIG. 2).

The pressure volume relationship of the lung chamber 8 is determined by the pressure volume relationship of the corrugated piston 5. In healthy subjects, the compliance is larger than in disease and is in a range that is known for adults and for neonates alike. The pressure-volume characteristic (compliance) of a corrugated piston 5 of a lung simulator is advantageously chosen to represent values close to the compliance of a healthy subject. The selection of the appropriate mechanical characteristics makes the addition of springs or other elements unnecessary. However, if need be, additional spring elements can be added to the corrugated piston to achieve the desired compliance values.

In disease, compliance will drop depending on the kind of disease. In the present invention, such decrease of compliance is affected by manipulating the freedom of movement of the corrugated piston 5 with a servo motor 14 fitted with a lever 20 and arranged such that said lever 20 stops or blocks the excursion of the second section 5b of the corrugated piston at certain positions determined by said servo motor 14. When the excursion of the second section 5b of the corrugated piston 8 comes to such halt, only the first section 5a of corrugated piston 5 remains free to move and can be compressed fully. Consequently, the effective compliance of the lung simulator is immediately reduced when stop 7 touches lever 20 (i.e. when blocked by lever 20). In the pressure-volume diagram, such sudden change in compliance is known as "upper inflection point" (in FIG. 2 indicated as UIP). Therefore, with a simple change of the position of the lever 20, said "upper inflection point" can be varied according to the disease to be simulated.

Moving lever 20 towards the lid 21 of the corrugated piston 5 causes said lid 21 to move towards the upper end of the rigid enclosure 29 into the vicinity of the valves 22-24 which connect the lung volume with the airway opening. Moving lever 20 even further eventually causes said lid 21 to touch said upper end 29. If this is the case, a certain pressure is needed to move the lid and to increase the volume of the lung compartment 8. Such pressure is called "opening pressure" or "lower inflection point" on the pressure volume curve, and is known to exist in disease (in FIG.

2 indicated as LIP). Therefore, with a change of the position of the lever 20, lung disease can realistically be simulated and different diseases can be implemented.

As disclosed above, advantageously at least one corrugated piston 5 divided into two sections 5a and 5b is employed in the present invention. Advantageously, the corrugated piston 5 is made of two portions 5a and 5b, connected with each other, as by the mechanical stop 7. Alternatively, three sections of corrugated piston joined in an alternating sequence with two mechanical stops can be used to expand the range of compliance values, if arranged in cooperation with as many levers for blocking the movement of the two stops at two predetermined locations on their path of movement during expansion of the corrugated piston. Optionally, mechanical spring elements could be added to single sections of a corrugated piston in order to create sections of differing compliance.

Figure 2:
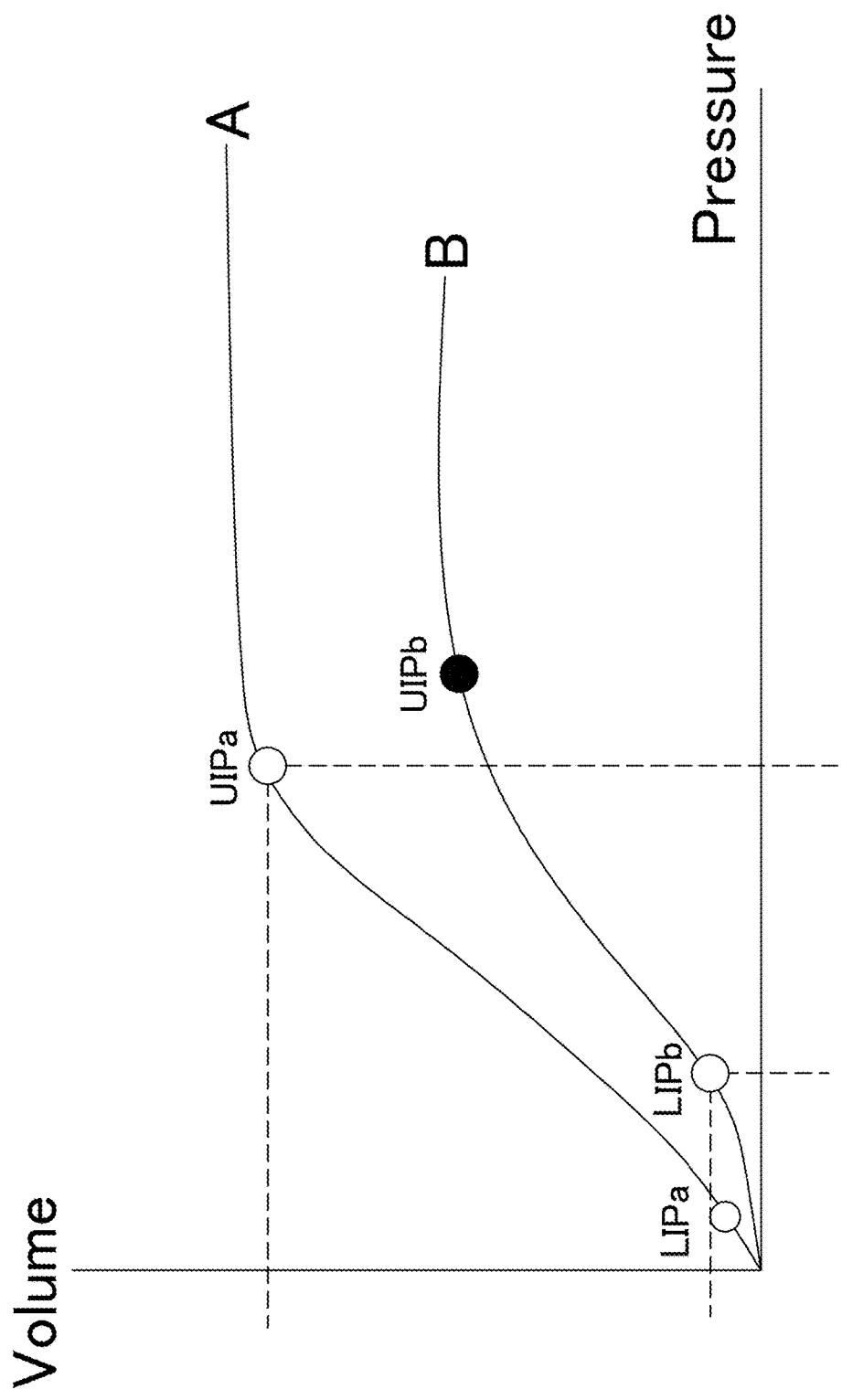
FIG. 2 shows a pressure volume curve in lungs for two typical patients: a healthy patient (curve A) and a patient with lung collapse (curve B)

FIG. 2 shows pressure volume curves in lungs for two typical patients: a healthy patient (curve A) and a patient with lung collapse (curve B).

The upper curve (curve A) is a typical pressure-volume curve of a healthy person: there is no pronounced lower inflection point (in that-if an inflection point is discernible at all—it is at very low pressure values) and the upper inflection point A appears at elevated pressures.

The lower curve (curve B) is a typical pressure-volume curve of a sick patient: the lower inflection point B is easily recognizable (at an elevated pressure value compared to curve A), the upper inflection point merges into a maximum volume which is much smaller than in curve A.

DC motor 12 along with the encoder 11 serves to measure instantaneous lung volume and tidal volume. Additionally, said DC motor is used to create spontaneous breathing by adding current to the DC motor. In mammals, spontaneous breathing is caused by the contraction of respiratory and auxiliary muscles which, in combination, effect a relative reduction of lung pressure compared to the ambient pressure. A reduction of lung pressure causes gas to enter the lungs, i.e. active breathing. In the present invention, the DC motor 12 can be provided with rhythmic changes in current at different current levels, thereby pulling on lid 21 with string 10 and simulating spontaneous activity at variable rate and depth. The success of such effort depends on the compliance set, the lower inflection point, the upper inflection point and the resistance to airflow as defined by the solenoid valves 22-24 and the airflow restrictors 25-26.

Exhaled CO2 can readily be simulated per computerised simulation in the current invention because inhalation phase and exhalation phase is continuously measured with the encoder attached to the DC motor. Thus, exhalation phase is known and CO2 can be simulated to increase during exhalation, to decrease during inhalation. Alternatively, for a physical simulation of CO2 production by the body and its elimination via the lung chamber 8, said lung chamber 8 is fitted with a CO2-inlet connected to a tube comprising an electrically controllable valve 19 connected to a CO2-supply 15 via a flow restrictor 18. A pressure sensor 17 is conveniently added upstream of the flow restrictor and measures the pressure drop across said flow restrictor 18 with tubing and the electrically controllable valve 19. The CO2-supply 15 provides pure CO2 at a pressure regulated by a pressure regulator 16. The position of the CO2-inlet is rather crucial to create a physiologic response since CO2 should be mixed with the gas inside the air chamber 8 before it is exhaled through the airway opening 1. The content of CO2 in the exhaled gas is often measured in patients for diagnostic purposes. Invariably, such measurement shows a sigmoid CO2 curve if measured against time or volume. To create such response it is essential to connect the CO2 inlet to the lung compartment 8, i.e. the alveolar space, rather than the tubing 25, 26, 27, 28 that simulates the airways. Advantageously, the connection of the CO2 inlet is done at the opposite end of lung compartment 8 relative to the airways. Thus, maximally far away from the airway inlets.

Figure 6:
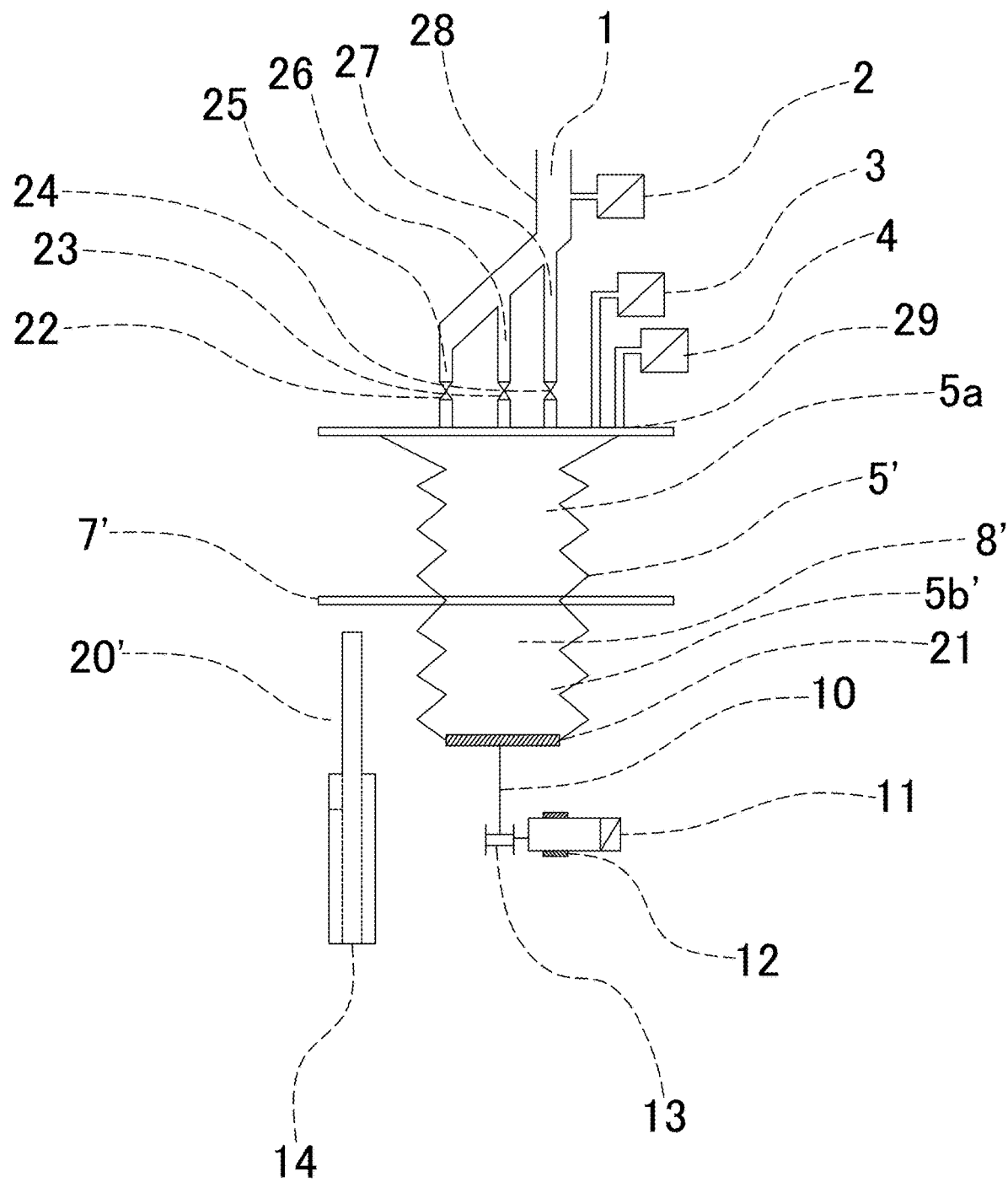
FIG. 6 shows an alternative physical lung model (PLM) according to the present invention.

In an alternative, second embodiment as depicted in FIG. 6, the lung compartment 8' is defined by the inside of a corrugated piston arrangement. The corrugated piston 5' on one end is closed by means of a closure plate 29' which is equipped with an airway 28, which e.g. may be designed as a singular (in particular unbranched) tube or as a manifold 25, 26, 27. The airway 28 is arranged such as to allow air movement in and out of the corrugated piston 5'. On its other end the corrugated piston 5' is closed by means of a lid 21' similar to the first embodiment.

A mechanical stop 7' is attached to said corrugated piston, effectively creating a divide between two sections of the corrugated piston 5a' and 5b'. In a practical implementation, two corrugated piston sections of similar elastic properties may be joined together with a mechanical fitting 7' in-between said two sections, which fitting serves also as a mechanical stop. Thus, the mechanical stop 7' may be formed as a rigid rim sandwiched between said two sections 5a' and 5b' and protruding therefrom into the exterior of the corrugated piston 5'.

In this alternative, second embodiment, the lung compartment 8' is delimited only by the corrugated piston 5', the lid 21' on the corrugated piston 5' and the fixture or closing plate 29' to which the corrugated piston 5' is attached. Airway tubing 25, 26, 27, 28 and sensing elements 2, 3, 4 are attached to the closing plate 29'. Optionally, the corrugated piston is manufactured with integrated mechanical fixture 29'. In this case, the mechanical fixture 29' is typically made of the same material as the corrugated piston, for example silicone.

In this alternative, second embodiment, the lever 20' is used, as described for the first embodiment, to effectively restrict the free movement of the mechanical stop (7) thereby changing the compliance of the lung compartment 8'.

Also in this embodiment the movement of the corrugated piston 5' can be influenced by the lever 20'. The inside of the corrugated piston 5' essentially defines the volume of the lung compartment 8'. The expansion of the lung compartment 8' is brought about by expansion of the corrugated piston 5'. The compression and expansion of the corrugated piston 5 is defined by the forces acting on the rigid lid 21', such as e.g. air flow pushed into the lung compartment due to artificial ventilation (piston expanding effect), motor force pulling the lid to simulate a patient's own inhaling effort (piston expanding effect), and an intrinsic restoring force of the corrugated piston 5' (compressing effect).

The piston 5' as shown in FIG. 6 is expanded by force. In idle status (i.e. resting), not shown, the piston 5' is reduced to a short tube with all folds plied maximally. Consequently, the corrugated piston 5' used in this second embodiment has a resting shape, which is short and strongly plied (therefore the elastic restoring property of the piston 5' essentially acts reducing, thus reduces the length of the corrugated piston 5' in order to bring the piston 5' into a more corrugated state, i.e. its resting state), while in contrast thereto, the corrugated piston 5 used in the first embodiment has a resting shape, which in comparison is longer and relatively little plied (therefore the elastic restoring force of the corrugated piston 5 of the first embodiment essentially acts expanding, thus enlarges the length of the corrugated piston 5 in order to bring the piston 5 into a less corrugated state, i.e. its resting state).

A comparison between the embodiment according FIG. 1 and alternative, second embodiment according FIG. 6:

In general, it may be said that a mechanical stop 7, 7' is attached to the corrugated piston 5, 5' and partitions the corrugated piston 5, 5' into a first corrugated section 5a, 5a' and a second corrugated section 5b, 5b'. In any case, during reduction and enlargement (i.e. compression and extension) of the corrugated piston 5, 5', the mechanical stop 7, 7' describes a path of movement.

In the first embodiment according to FIG. 1 the lever 20 blocks the movement of the stop 7 at a predefined point on the path of movement during reduction (compression) of the corrugated piston 5 and, and thereby consequently, restricts further reduction (compression) of the second section 5b of the corrugated piston 5 and, thus, overall restricts enlargement of the lung compartment 8.

In the alternative embodiment according to FIG. 6 the lever 20' blocks the movement of the stop 7' at a predefined point on the path of movement during enlargement (extension) of the corrugated piston 5' and, thereby consequently, restricts further enlargement (i.e. extension) of the section 5a' of the corrugated piston 5' and, thus, overall restricts enlargement of the lung compartment 8'.

Both embodiments allow to implement and vary airway resistance, lung compliance and upper inflection points with values typical for health and disease. In particular, both embodiments allow to change the overall compliance of the lung compartment as well as the position of the upper inflection point by virtue of moving the lever 20, 20' into different positions thereby effectively simulating different diseases. Both embodiments allow to add spontaneous breathing at various levels by virtue of letting the motor 12, 12' pull on the string 10, 10' in controllable intervals and controllable strength. Both embodiments allow the measurement of pertinent parameters such as airway pressure, alveolar pressure, alveolar oxygen concentration, lung volume and tidal volume to be used in the physiological modelling and calculation of outcome variables as described below. However, there are a few differences between the two embodiments.

A first difference is that the alternative, second embodiment does not allow to effectively add and change a lower inflection point (LIP in FIG. 2). A healthy lung is characterised by an almost indiscernible lower inflection point (LIPa). A sick lung is characterised by a clearly visible lower inflection point (LIPb) due to the fact that the lungs are collapsed and need a certain opening pressure. The alternative, second embodiment, described in FIG. 6, allows to change the overall compliance of the lung compartment as well as the position of the upper inflection point by virtue of moving the lever 20' into different positions thereby effectively simulating different diseases. However, it does not allow to modify the lower inflection point because the corrugated piston portion 5b' can always enlarge the volume of compartment 8', independent of the position of lever 20', and thus no pronounced lower inflection point can be created. In contrast, and as described above, the first embodiment allows to add and modify the LIP by virtue of moving lever 20 position and as described in the previous chapter.

A second difference concerns the simulation of $CO_2$ production. As described above, advantageously $CO_2$ is injected away (i.e. in a distance) from the airway or airway manifold, as far away as possible to create a physiological simulation result. In the alternative, second embodiment, the lid 21' is far enough, yet does not lend itself to suitable connection of tubing. Any attachment of parts to the lid 21' would alter the mechanical properties of the movement of said lid 21' which will be clinically visible and is thus undesired. If tubing is attached to the lid 21', it should be attached in a manner not influencing or affecting the free movement of said lid 21'. Therefore, injection of $CO_2$ in the second embodiment is technically challenging.

A third difference concerns the possibilities of arranging the physical lung simulator in different positions and integrate it in a mannequin of the size of a newborn or even premature born baby. The first embodiment has the advantage that the corrugated piston 5 inside the enclosure cylinder 6 is under pressure by the pressure in the lung compartment 8. Because pressure acts from all sides on the corrugated piston 5, the position of the corrugated piston 5 is somewhat stabilized and the corrugated piston 5 is not pressed against the cylinder wall of the enclosure 6 by the pressure. The advantage is that the frictional forces are minimal. In the alternative, second embodiment the internal pressure moves the corrugated piston 5' wherever the mechanical properties of the corrugated piston 5' lead-which can result in significant force against a surrounding chassis (not shown in FIG. 6) and thus artefacts on the signals which are fed to the physiological model, thereby creating distortions of simulated reality. One solution is to suspend the corrugated piston vertically in order not to touch any objects. However, such suspension is not possible if the physical lung model be integrated in a mannequin of small size. Furthermore, the alternative, second embodiment provides a challenge regarding stably coupling the stop 7' with the lever 20'. To act symmetrically on the corrugated piston 5', the stop 7' encompasses the entire circumference of the corrugated piston 5'. Consequently, the lever 20' also should act on at least 3 equally spaced points on the stop 7' to effect a symmetrical halt of movement. Such an arrangement is larger than the corrugated piston diameter. In the first embodiment, the stop 7 can be integrated in the centre of the corrugated piston 5 and the lever 20 can act on this centre. There is no need to add components on the outer circumference of the corrugated piston 5. Potentially, this renders the first embodiment more compact than the second embodiment.

Lung Simulator

In simulation sessions, the simulated pathology is set by the trainer according to the training objectives. A set of parameters determines a given pathology. In the present invention, the trainer selects a certain pathology using a Graphical User Interface (GUI) 36, see FIG. 3. Said GUI communicates the desired pathophysiological model to the Physiological Model Unit PMU 35 through a set of data F. The Physiological Model unit PMU has a number of tasks:

First, it transforms data F into a set of parameters D that can be applied by the Control Unit CU 34 to the Physical Lung Model PLM 33.

Second, the PMU 35 calculates the "health status" or outcome of the simulated patients from the measured set of data C, for example oxygen saturation of the arterial blood. The result is communicated to the GUI 36 (Data E) and, if so desired by the trainer, also to the trainee using the Diagnostic Module DM 37 (Data G).

Third, if data C from said Control Unit CU 34 indicates a change of parameters as a result of the actions of the trainee and can be inferred from said data C, PMU recalculates the set of parameters D. The recalculated set of parameters D can simulate either an improvement (like "healing") or a deterioration of the situation. For example, the breath rate of mammals depends on the mechanical characteristics of the respiratory system and if the trainee changes therapy to make lung compliance better, patients typically respond with a decrease in rate and an increase in breathing volume. Such change of rate is calculated by the PMU.

Figure 3:
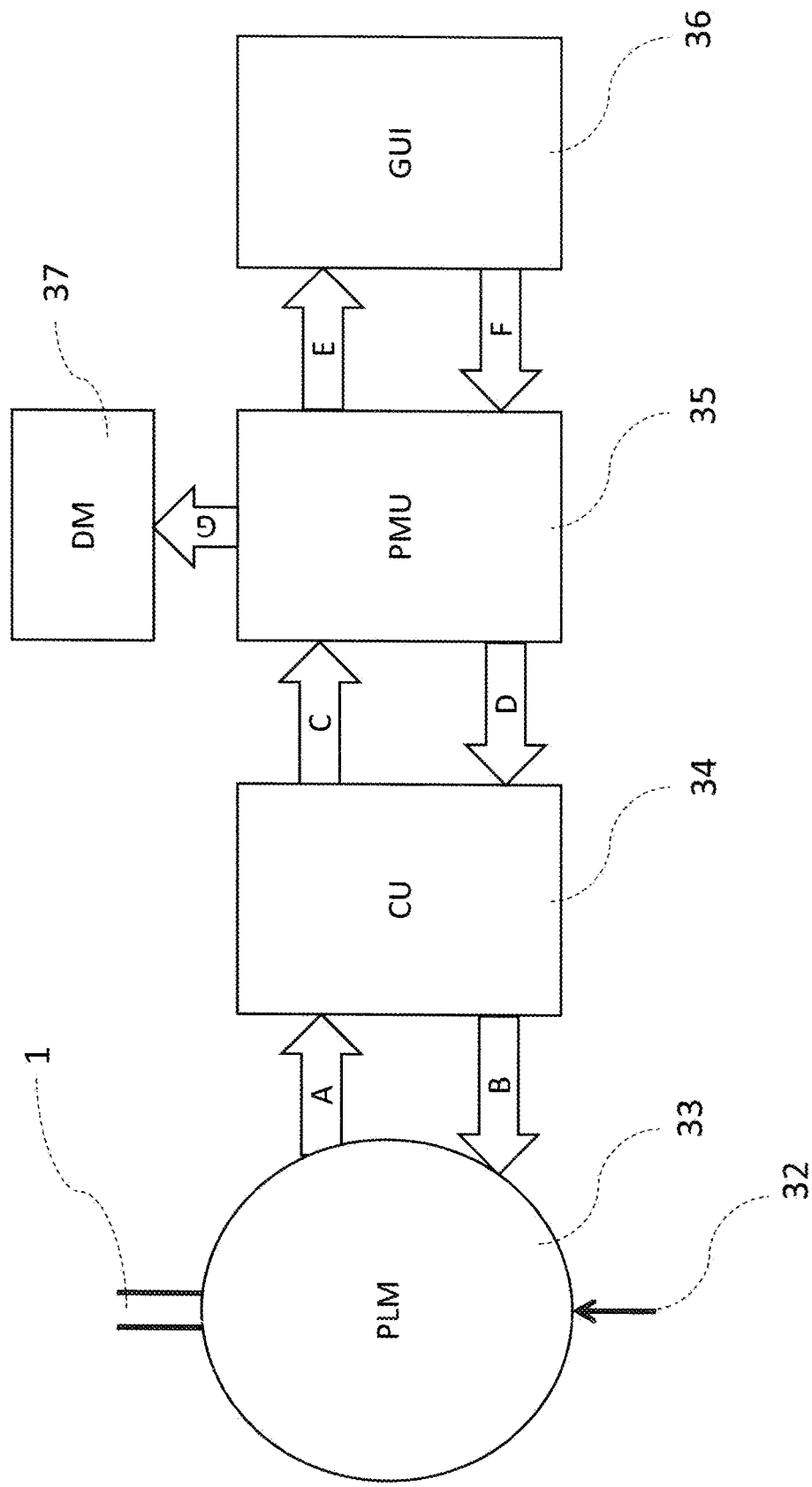
FIG. 3 shows a system diagram and data streams of a lung simulator comprising a physical lung model, such as e.g. shown in FIG. 1.

The system diagram of FIG. 3 depicts a lung simulator with its elements and its data streams.

The lung simulator comprises a Physical Lung Model PLM 33. Details of the PLM are given in FIG. 1, an alternative PLM is given in FIG. 6. In FIG. 3 for clarity reasons the airway opening 1 and the supplies 32, such as CO2 and power are indicated explicitly.

The Control Unit CU 34 reads sensor and status data from the PLM (data A) and sets the actuators within the PLM (data B).

The Physiological Model Unit PMU 35 merges data from the PLM (C) and the pathophysiology desired by the operator (F) to come up with the internal settings of the PLM (D) using physiological and pathophysiological models.

The Graphical User Interface GUI 33 accepts a selection of patient from the operator, selects the physiological model and provides this information to PMU (F). Moreover, the GUI displays the actual state of the simulated patient provided by data E, records this data and makes it available for later display during the debriefing sessions.

The Diagnostics Module DM 37 provides for the trainee information about clinical signs (for example skin colour, patient movement, grunting, auscultation) and available diagnostic procedures, for example lab results available such as blood gases, level of oxygen saturation in the arterial blood through the attachment of a pulse oximeter, x-ray, CT scan, etc.

Data A comprise analog and digital signals from the sensors (e.g. 2, 3, 4, 17) and actuators (e.g. 18, 25, 26, 27), motors (e.g. 12, 14) and encoders (e.g. 11).

Data B comprise analog and digital signals to control actuators (e.g. 18, 25, 26, 27) and motors (e.g. 12, 14) and valves (e.g. 16, 19, 22, 23, 24).

Data C comprise real-time data, sampled at 100 Hz, or at 200 Hz, and status information, typically once per second.

Data D comprise a set of parameters like position of the servo motor (e.g. 14), combination of the on-off valves (e.g. 22, 23, 24) to create airways resistance, and real-time data such as breathing effort or heart activity.

Data E comprise outcome variables such as compliance, resistance, oxygen saturation, CO2 level in the blood, lung volume, degree of collapse, etc., also real-time data for display.

Data F comprise pathophysiological modes selected by the trainer.

Data G comprise outcome variables that are shown on the mannequin, for example the colour of the skin to indicate hypoxaemia, restlessness of limbs to indicate respiratory distress. Data G also comprise outcome variables that can be assessed using special monitoring, for example pulse oximeters or blood gas machines are provided by the diagnostic module.

According to the present invention the CU of such apparatus is configured to effect the internal settings of the PLM in order to achieve the mechanical properties and gas exchange properties commensurate with the physiological parameters selected by the PMU to satisfy the pathophysiology set by the trainer on the GUI. Said pathophysiology set by the trainer is transformed into parameters that cause the PLM to react accordingly such as change in lung volume, change in pressures, or change in parameters that represent haemodynamic properties such as blood pressure and arterial oxygenation.

A wide range of pathophysiological models can be incorporated into the PMU and since the model is parametrized, it is fully programmable to accept future pathophysiological models. Pathophysiological models work within specific ranges of values of given sets of parameters and define specific dependencies between the physical and the physiological parameters.

The calculation of a change of said values forms a basis for an adaptation of the operation condition and may be achieved by automated adjustments which will render the apparatus ready for clinical training purposes and execute real-life clinical scenarios.

The response of the simulated patient depends on the treatment. Different trainees can in fact respond completely differently to a given patient and the pathophysiological model shall not force such response but react either positively or negatively to such treatment, as the case may be. The evaluation of the trainees' therapy will ultimately be up to the trainer who will evaluate trainee performance based on the patient's condition achieved during or after the treatment. Such response is not predictable but will depend on the interaction between physiological model and treatment, usually done with a mechanical ventilator or an anaesthesia machine.

For the simple connection of the apparatus 33 with a mechanical ventilator or anaesthesia machine, the airway opening 1 of the lung volume compartment 8 of the physical lung model 33 is fitted with an airway adapter (not shown in Fig.). Such airway adapter is connectable to a ventilator to be tested or used for training.

Figure 4:
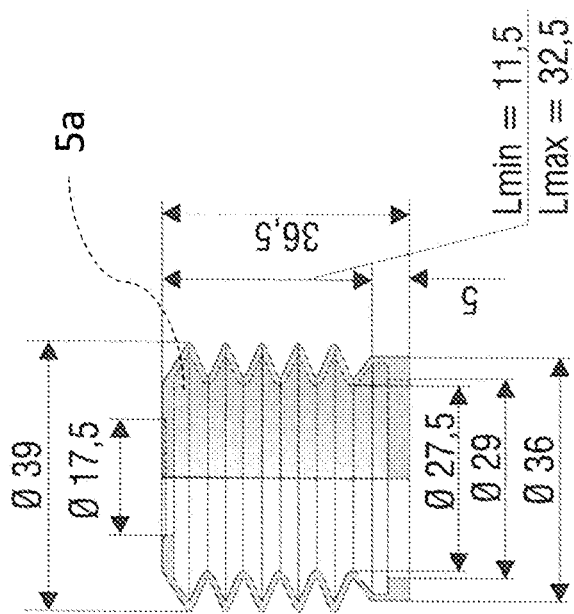
FIG. 4 shows a section of a corrugated piston.
Figure 5:
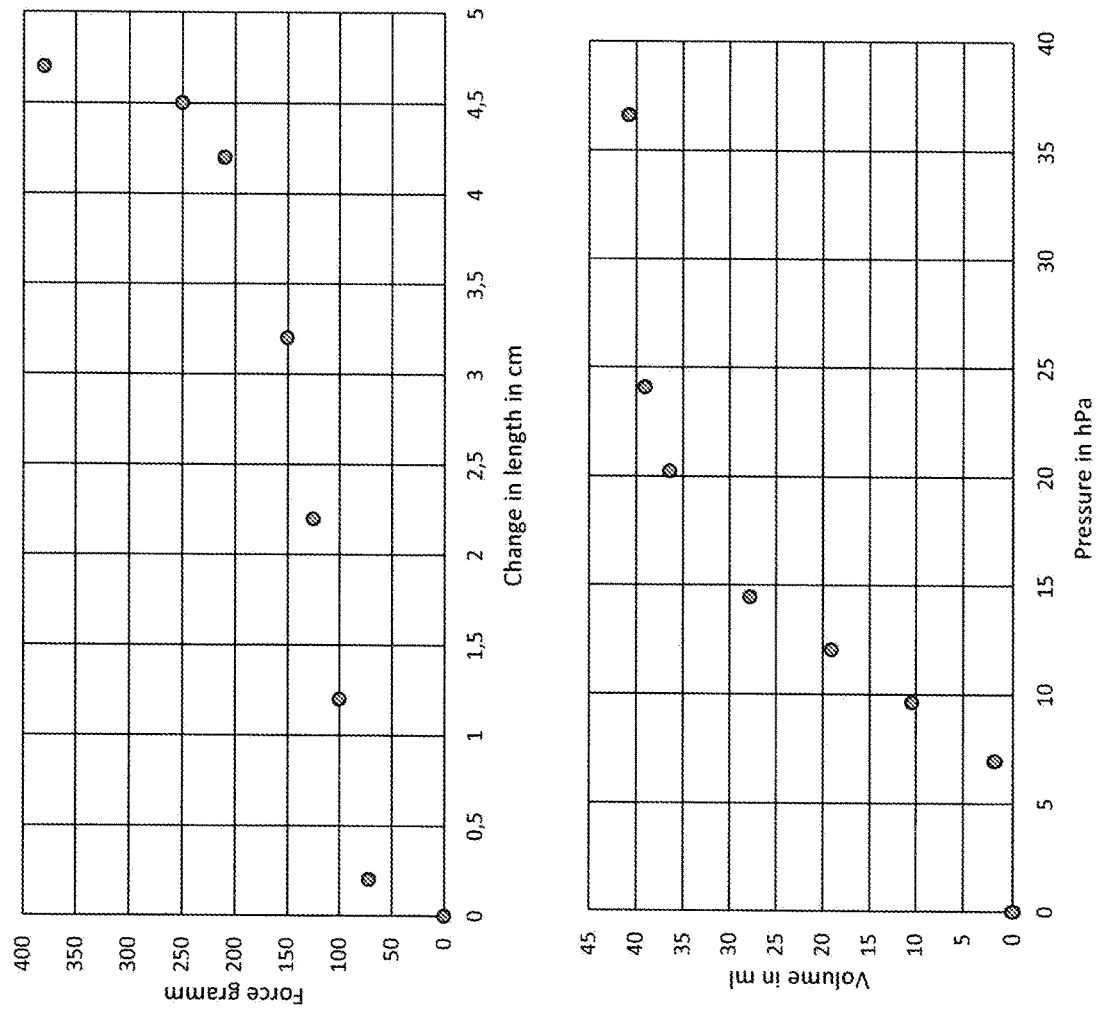
FIG. 5 shows sigmoid force-length relationship (top diagram) and its transformation into a pressure volume curve typical for human lungs (bottom diagram)

The invention makes use of the physical characteristics of the corrugated piston 5 as determined by the materials and dimension used for manufacturing, for example silicone. For example, two corrugated pistons arranged in series forming sections 5*a* and 5*b* and each with the measures provided in FIG. 4 show the sigmoid force-length relationship disclosed in FIG. 5 top diagram. Transformed into units of pressure (force divided by the relevant area) and volume (length change times relevant area) and swapping the axes, yields the pressure volume curve typical for human lungs, particularly neonates (FIG. 5 bottom diagram).

For simulating a patient's condition values of a plurality of the following parameters of the PLM model may be chosen according to a pathological model or healthy physiological conditions:

Excursion of the extension lever 20
Current or force of the DC motor 12
Open/close status of the valves 22, 23, 24
Pulse width and frequency of the solenoid valve 19

These parameters, together with other and possibly only virtually simulated parameters, such as chest wall compliance, for example, constitute a certain pathology.

The excursion of the extension lever 20 determines both, the respiratory compliance of the PLM, the lower inflection point and possibly a mid inflection point (a deflection of the pressure volume curve between the lower and upper inflection point).

The tidal volume Vt, the respiratory rate RR and the end-expiratory lung volume VLee are measured using the encoder 11 signals and analysing the changes of the encoder values over time. For example, the first derivative of the encoder 11 signal provides the flow of gas. Each zero crossing of that flow marks the beginning of either inhalation or exhalation. These marks can be used to measure tidal volume and respiratory rate. The comparison of VLee with the expected FRC yields the degree of venous admixture. Additionally, the oxygen content inside the lung compartment 8 is measured with a sensor 4. Together with the level of venous admixture, the oxygen content of air in the lung compartment 8 determines the level of oxygen in the arterial blood.

The current to the DC motor 12 determines the constant tension on the wire 10. The current can be increased to pull the lever of the corrugated piston, thereby increasing the lung volume. Neonates try to reduce exhalation flow by grunting, thereby increasing the end-expiratory lung volume to improve oxygenation of the arterial blood. Such effect can be simulated by adding current to the DC motor 12. Current can also be added during inhalation, simulating inspiratory effort or spontaneous breathing. In fact, current with randomly selectable waveform can be added to create any form and timing of inspiratory activity.

The solenoid valves 22, 23, 24 provide access to the lungs in different combinations. In effect, the three different valves are fitted with three different resistances to airflow, 25, 26, and 27, respectively. The different combinations will result in different airways resistance Raw. For example, airway constriction can be simulated by selecting a high airways resistance. The arrangement of solenoids in FIG. 1 is completely parallel. However, other arrangements of solenoid valves can be used equally well for example a combination of series and parallel arrangement.

CO2 production is simulated by adding pure CO2 to the lung chamber by virtue of opening valve 19 in rhythm of the heart beat and with an opening time which allows CO2 of a given volume to be applied. The volume per beat will depend on the CO2 pressure. CO2 is stored in liquid form at around 57 bar (room temperature) and should be reduced by the pressure reduction valve 16 to become manageable by a commonly available solenoid. A pressure sensor 17 measures the pressure and CO2 is flowing through the flow restrictor 18 into the lung chamber as long as solenoid 19 is open. The volume so applied is proportional to the time the solenoid valve 19 is open and the pressure upstream to the flow restrictor 18.

Using the above described parameters, it is possible to simulate a number of relevant physiological and pathophysiological conditions to train clinicians in the use of nasal CPAP and mechanical ventilators.

DESCRIPTION OF USE

The lung simulator described herein can be readily and directly connected to any breathing support device, including bag, nasal continuous positive airway pressure, continuous positive airway pressure, high flow oxygen, mechanical ventilator, anaesthesia machine or other devices. The trainer sets the desired pathology and gives pertinent tasks to the trainee, for example to attach a respiratory support device and set the parameters of that device correctly. The trainer does not need to disclose the simulated disease of the patient because some signs and symptoms are provided by the lung simulator. The results of the treatment are made known to the trainer and, if so desired, to the trainee via a separate monitor or the graphical user interface provided to the trainer.

Another use of the lung simulator is to serve as a reference in order to test respiratory devices such as pressure sensors, flow transducers, ventilators, and other. The signals of the devices under test can be compared with the signal of the lung simulator and analysed for accuracy and precision.

The invention claimed is:

1. A physical lung model (PLM) for training and teaching, comprising:
    a lung compartment which is delimited by:
        an enlargeable and reducible piston for enlarging and reducing the volume of the lung compartment;
        a lid sealing a first end of the piston; and
        a support body carrying the piston, a second end of the piston sealingly attached to the support body;
    an airway leading from the lung compartment to an airway opening;
    a mechanical stop attached to the piston and partitioning the piston into a first enlargeable and reducible section and a second enlargeable and reducible section, the mechanical stop describing a path of movement during enlargement of the lung compartment; and
    a lever for blocking movement of the stop at a predefined point on the path of movement during enlargement of the lung compartment and, thereby, restricting the enlargement of the lung compartment.

2. The physical lung model of claim 1, wherein the lever is adjustable for setting said predefined point at any desired position on said path of movement of the stop during operation of the physical lung model.

3. The physical lung model of claim 1, wherein the mechanical stop and the lever are arranged outside of the lung compartment.

4. The physical lung model of claim 1, wherein, for the purpose of adjusting the lever, the lever is driven by a motor.

5. The physical lung model of claim 1, wherein the piston is a corrugated piston.

6. The physical lung model of claim 1, further comprising means for determining a position of the lid or changes of the position of the lid and based on the position of the lid or the changes of the position of the lid is used to determine a volume of the lung compartment or volume changes of the lung compartment over time.

7. The physical lung model of claim 1, further comprising a string with one end fixed to the lid and with another end wound-up on a reel and a rotary encoder coupled to the reel, and wherein the rotary encoder serves for measuring the rotation of the reel and for determining the position or change of position of the lid.

8. The physical lung model of claim 7, further comprising a motor to drive the reel to wind-up the string to simulate a patient's own inhaling effort.

9. The physical lung model of claim 1, wherein the support body is shaped as a cylinder larger than the piston, at a first end comprises a cover plate and at a second end carries the piston, and wherein the support body and the piston are mutually arranged such that the piston is housed within the cylinder of the support body.

10. The physical lung model of claim 1, wherein the volume of the compartment is enlarged when reducing the piston.

11. The physical lung model of claim 10, wherein the lung compartment comprises an inlet of a gas supply, said inlet arranged near or at a second end of the cylinder-shaped support body.

12. The physical lung model of claim 11, wherein the piston comprises a restoring force, for restoring a length of the piston.

13. The physical lung model of claim 1, further comprising an artificial ventilator attached to the airway opening for simulating artificial ventilation.

14. A lung simulator for treating and training, comprising:
    a physical lung model comprising:

a lung compartment delimited by:
  an enlargeable and reducible piston for enlarging and reducing a volume of the lung compartment;
  a lid sealing a first end of the piston; and
  a support body carrying the piston, a second end of the piston sealingly attached to the support body;
an airway leading from the lung compartment to an airway opening;
a mechanical stop attached to the piston and partitioning the piston into a first enlargeable and reducible section and a second enlargeable and reducible section, the mechanical stop describing a path of movement during enlargement of the lung compartment;
a lever for blocking movement of the stop at a predefined point on the path of movement during enlargement of the lung compartment and, thereby, restricting the enlargement of the lung compartment;
a control unit configured to read sensor and status data from the physical lung model and set actuators, in the physical lung model;
a physiological model unit configured to compare sensor and status data from the physical lung model with data desired and input by an operator and to provide amended settings for the physical lung model on a basis of physiological or pathophysiological models; and
a graphical user interface receiving operator input and presenting sensor and status data of the physical lung model provided via the physiological model unit.

15. The lung simulator of claim 14, further comprising a diagnostic module configured to provide simulated patient reactions on a basis of sensor and status data from the physical lung model or allowing for carrying out diagnostic procedures.

16. A method of simulating lung mechanics, for training and teaching purposes, comprising:
  providing an enlargeable and reducible piston having two ends, wherein a lid is attached sealingly to the first end of the piston and the piston with a second end is sealingly attached to a support body, the support body, piston and lid forming an enlargeable and reducible compartment, so that the first end of the piston may move freely during enlargement and reduction of the piston;
  enlarging and reducing said compartment by enlarging and reducing the piston for simulating enlargement and reduction of a lung volume; and
  restricting the enlargement of the compartment by blocking a movement of a section of the piston during enlargement of the compartment for simulating reduced lung compliance.

17. The method of claim 16, wherein the compartment is enlarged when reducing the piston.

18. The method of claim 16, wherein the compartment is enlarged when enlarging the piston.

19. The method of claim 16, further comprising a mechanical stop attached to the piston and dividing the piston into a first enlargeable and reducible section and a second enlargeable and reducible section, and wherein movement of a section of the piston can be blocked by restricting movement of the mechanical stop by a lever attached to the support body or a common support of the support body and the lever.

20. The method of claim 16, further comprising determining a volume or volume change of the compartment over time, determining the position of the lid by a rotary encoder coupled to a motor-driven reel to wind-up a string, which with one end is fixedly attached to the lid, for measuring a change of length of the wound-up string, and wherein a motor is controlled by a constant current to keep the string pulled taut.

21. The method of claim 20, wherein the motor is controlled to pull the lid with variable force to simulate a patient's inhaling effort.

22. The method of claim 16, wherein exhaling is simulated by reducing all applied forces so that the extension of the piston restores due to its elastic properties.

* * * * *